July 14, 1936.  W. A. SMITH, SR  2,047,714

HOSE COUPLING

Filed Dec. 29, 1934

INVENTOR.
William A. Smith S
BY
HIS ATTORNEY.

Patented July 14, 1936

2,047,714

UNITED STATES PATENT OFFICE 2,047,714

HOSE COUPLING

William A. Smith, Sr., Athens, Pa., assignor to Ingersoll-Rand Company, Jersey City, N. J., a corporation of New Jersey Application December 29, 1934, Serial No. 759,658

1 Claim. (Cl. 285—82)

This invention relates to couplings, and more particularly to a hose coupling adapted to connect hose or conduit sections in end to end relationship with respect to each other.

One object of the invention is to enable the hose sections to be quickly connected together or detached from each other.

Another object is to employ the hose as a sealing means for preventing leakage of pressure fluid from the coupling.

Other objects will be in part obvious and in part pointed out hereinafter.

Figure 1:
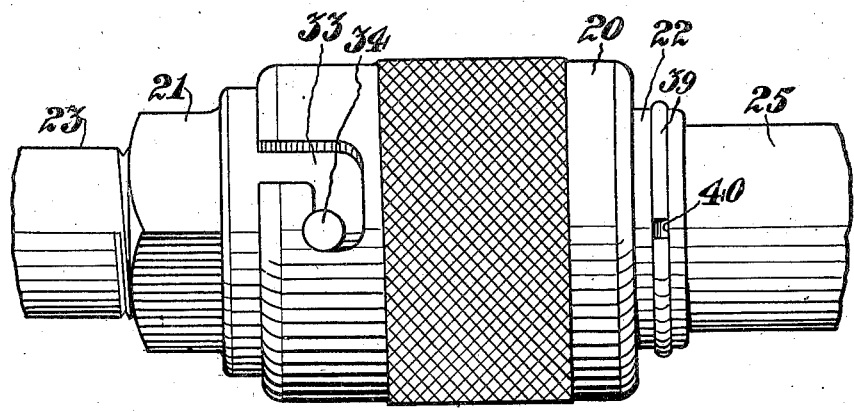
Figure 2:
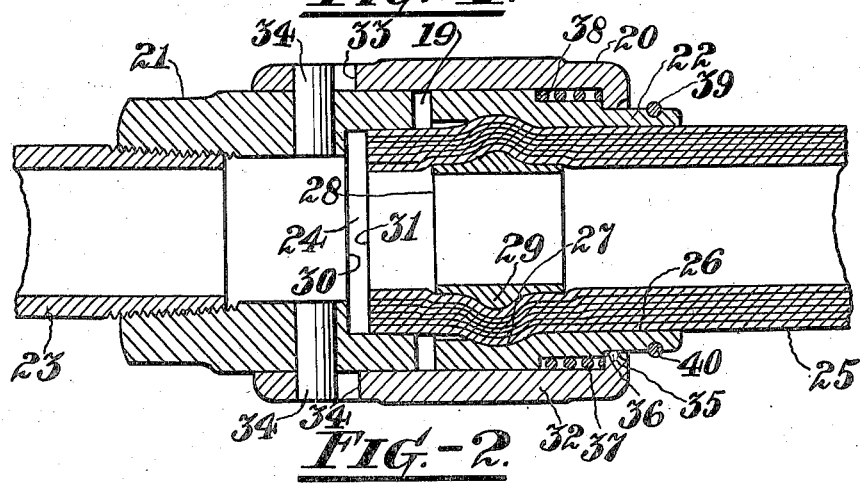
Figure 3:
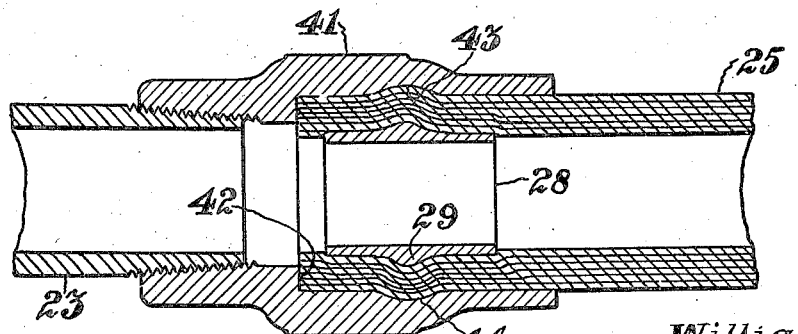

In the accompanying drawing and in which similar reference numerals refer to similar parts, Figure 1 is a longitudinal side view of a hose coupling constructed in accordance with the practice of the invention, Figure 2 is a longitudinal view, in section, of the hose coupling, and Figure 3 is a view similar to Figure 2 showing a modified form of the invention.

Referring more particularly to the drawing, and at first to the form of the invention illustrated in Figures 1 and 2, 20 designates a hose coupling comprising a pair of sleeves 21 and 22 which are arranged in end to end and non-contacting relationship with respect to each other and to provide a space 19 between their adjacent ends. One of the sleeves, as for instance that designated 21, is threaded internally for connection to a pipe 23. Extending through the sleeve 22 and into a recess 24 in the sleeve 21 is a flexible hose 25 to convey pressure fluid from the pipe 23 to a machine intended to be actuated. The hose is of the same diameter as the recess 24 and its outer surface is in constant contact with the wall of the recess.

The bore 26 in the sleeve 22 is preferably of the same diameter as the recess 24 and near its innermost end is an annular groove 27 into which is pressed a portion of the hose 25 by a ferrule 28 disposed within the hose. The ferrule illustrated is in the form of a sleeve having an annular rib 29 on its periphery. The rib is of larger diameter than the interior of the hose so that upon insertion of the ferrule 28 into the hose the portion of the hose surrounding the rib 29 is bulged outwardly into the groove 27.

Preferably, the hose is extended only part way into the recess 24 to permit a space between the bottom surface 30 of the recess and the confronting end 31 of the hose. Thus, these surfaces will serve as pressure surfaces which are exposed to pressure fluid tending to separate the sleeves 21 and 22.

To the end that the sleeves may be expeditiously connected together or detached from each other they are arranged in a casing 32 which is both slidable and rotatable upon the sleeves. The casing 32 prevents relative transverse movement of the sleeves and is provided at one end with bayonet slots 33, to receive lugs or pins 34 carried by the sleeve 21.

On the opposite end of the casing 32 is an introverted flange or shoulder 35 adapted to abut a shoulder 36 on the sleeve 22 to retain said sleeve within the casing 32. The flange 35, moreover, serves as a seat for an end of a spring 37 within the casing and which spring seats with its opposite end against a shoulder 38 on the periphery of the sleeve 22.

A spring ring 39 is arranged in a peripheral groove 40 in the sleeve 22 to limit endwise movement of the casing 32 with respect to the sleeve 22.

In assembling the device, the hose section 25 is disposed within the sleeve 22. The end of the hose section is extended beyond the inner end of the sleeve 22 a sufficient distance to allow it to extend into the recess 24 without, however, seating upon the bottom of said recess, in the assembled position of the sleeves. The ferrule 28 is then inserted into the hose to a position wherein the annular rib 29 lies in the plane of the groove 27. Thus, the surrounding portion of the hose is bulged outwardly into the groove 27 and the hose 25 is thereby retained within the sleeve 22.

The casing 32 may then be moved to a position to effect engagement between the slots 33 and the pins 34 and the connection between these elements will be maintained by the spring 37 which acts to press the outer surfaces of the bayonet slots against the pins 34. If then the hose is opened to pressure fluid supply the pressure fluid acting against the portion of the inner surface of the hose lying between the ferrule 28 and the end 31 of the hose will expand the hose and maintain its outer surface firmly seated against the side wall of the recess 24 to assure a seal between these elements.

The pressure fluid will also act against the surfaces 30 and 31 and exert a force thereon tending to separate the sleeves 21 and 22 and thereby maintain the shoulders 36 and 35 and the slot 33 and pins firmly in engagement with each other.

In practice the present invention has been found to be a highly efficient device for connecting pressure fluid conduits together. The sleeve portions of the coupling may be quickly connected or detached from each other and, when assembled, will be held firmly in that position by the force of the pressure fluid acting against the sleeve 21 and the end of the hose 25. A further highly desirable feature of the present invention is that by utilizing the end of the hose as a means for preventing leakage from the coupling the need of separate gaskets or packing devices has been entirely eliminated.

In the modified form of the invention illustrated in Figure 3 only one sleeve, designated 41, is required. The sleeve 41 is threaded internally at one end for connecting it to the pipe 23, and the hose 25 is inserted in the other end of the sleeve and preferably seated with its end against an internal shoulder 42. The sleeve 41 also has an internal annular groove 43 to receive an annular ridge 44 of the hose 25 caused by the rib 29 on the ferrule 28.

In assembling the hose 25 within the sleeve 41 the hose is first inserted into the sleeve until the end of the hose seats against the shoulder 42. Upon insertion of the ferrule 28 in the hose the sleeve 41 may be connected to the pipe 23 and the conduits communicated with a source of pressure fluid supply.

As in the modification of the invention previously described the end of the hose also extends beyond the corresponding end of the ferrule so that the pressure fluid may act against the interior surface of the hose to press the outer surface into fluid tight relationship with the inner surface of the sleeve 41.

I claim:

A hose coupling comprising a pair of sleeves arranged end to end in non-contacting relation with respect to each other, one of said sleeves having an internal annular groove, a hose in the sleeves and having a portion of its inner surface subjected to pressure fluid to expand the hose into sealing relationship with the adjacent sleeve, a ferrule in the hose to press a portion thereof into the groove, a casing encircling the sleeves and being slidable thereon, interlocking portions on the casing and one of the sleeves for detachably securing the casing to the sleeves, shoulders on the casing and the other sleeve, a spring interposed between the shoulders, and opposed pressure areas on one of the sleeves and the hose subjected to pressure fluid tending to separate the sleeves and thereby maintain the interlocking portions firmly in engagement with each other.

WILLIAM A. SMITH, Sr.